United States Patent
Guryevskiy et al.

(10) Patent No.: US 8,316,842 B2
(45) Date of Patent: Nov. 27, 2012

(54) SOLAR HEAT COLLECTOR

(76) Inventors: Natan Guryevskiy, Brooklyn, NY (US); Boris Guryevskiy, Brooklyn, NY (US)

(*) Notice: Subject to any disclaimer, the term of this patent is extended or adjusted under 35 U.S.C. 154(b) by 1471 days.

(21) Appl. No.: 11/138,032

(22) Filed: May 26, 2005

(65) Prior Publication Data
US 2006/0042625 A1 Mar. 2, 2006

Related U.S. Application Data

(60) Provisional application No. 60/603,891, filed on Aug. 24, 2004.

(51) Int. Cl.
*F24J 2/50* (2006.01)
(52) U.S. Cl. .......................... 126/651; 126/705; 126/709
(58) Field of Classification Search .................. 126/651, 126/663, 674, 676, 677, 709, 705
See application file for complete search history.

(56) References Cited

U.S. PATENT DOCUMENTS

| | | | | |
|---|---|---|---|---|
| 3,952,725 A | * | 4/1976 | Edmondson | 126/659 |
| 4,426,999 A | * | 1/1984 | Evans et al. | 126/669 |
| 4,637,374 A | | 1/1987 | Arai | |
| 4,777,936 A | | 10/1988 | Arai | |
| 2004/0050532 A1 | * | 3/2004 | Yamaguchi et al. | 165/46 |

FOREIGN PATENT DOCUMENTS

| | | |
|---|---|---|
| GB | 2081877 | 2/1982 |
| GB | 2112923 | 7/1983 |

* cited by examiner

*Primary Examiner* — Alfred Basichas
(74) *Attorney, Agent, or Firm* — James Ray & Assoc.

(57) ABSTRACT

A solar heat collector for using solar energy to heat a fluid flowing therethrough includes a housing having a portion facing the sun. A predetermined plurality of tubular members are disposed within the housing with each tubular member connected to a fluid input and a fluid output for carrying a fluid through the housing. An absorption film is attached to the sun facing portion of the housing. A filler member engages the absorption film and a predetermined portion of each tubular member for improving heat transfer efficiency of the absorbed solar energy from the absorption film to each tubular member. A material of the filler member has thermal conductivity greater than a thermal conductivity of air at zero degrees Celsius.

13 Claims, 1 Drawing Sheet

US 8,316,842 B2

SOLAR HEAT COLLECTOR

CROSS-REFERENCE TO RELATED APPLICATIONS

This application is related to and claims priority from U.S. Provisional Patent Application Ser. No. 60/603,891 filed on Aug. 24, 2004.

FIELD OF THE INVENTION

The present invention relates, in general, to a solar heat collector and, more particularly, the invention relates to a solar heat collector having a filler medium with improved thermal conductivity.

BACKGROUND OF THE INVENTION

Solar heat collectors utilizing hollow pipes or tubes that carry fluid for heat absorption and transfer are well known in the art. They generally include a frame wherein a plurality of tubes or pipes are arranged in a predetermined pattern and connected to a fluid input for receiving such fluid. The solar heat accumulates on the upper surface of the collector. The medium, which is air, within the collector transfers the heat from the upper surface to outer surfaces of such pipes or tubes.

As the fluid flows trough the pipes or tubes it absorbs the heat from their surfaces and exists through a fluid output connection to a point of use. The fluid transfers the absorbed heat at such point of use and returns to the solar heat collector to repeat the absorption and transfer cycle.

To facilitate the solar heat collection, a selective absorption film, generally referred to as a black body, is applied to the upper surface of the collector.

The main disadvantage of the presently used solar heat collectors is the air medium that fills the space between the outer surfaces of such pipes or tubes and the selective absorption film. As it is well known, the air medium is characterized by a low thermal conductivity and high resistance to heat therefore reducing the efficiency of the heat transfer process from the black body to the heating fluid.

Therefore, there is a need for an improved solar heat collector which economically improves heat transfer efficiency of the solar collector.

SUMMARY OF THE INVENTION

The present invention provides a solar heat collector for using solar energy to heat a fluid flowing therethrough. The solar heat collector includes a housing having a first portion facing the sun and an opposed second portion adapted for attachment to a surface of a structure. A predetermined plurality of tubular members are disposed within the housing with each tubular member connected to a fluid input and a fluid output for carrying a fluid flowing through the housing. An absorption film is attached to the sun facing portion of the housing. A unitary filler member engages the absorption film and a predetermined portion of each tubular member for improving heat transfer efficiency of the absorbed solar energy from the absorption film to each tubular member. The filler member is formed from a material having thermal conductivity greater than a thermal conductivity of air at zero degrees Celsius. The filler member is adapted with cavities for receiving each tubular member thus increasing surface contact with each tubular member. Alternative embodiments of the filler member include a modular construction for applications prohibiting installation of such unitary filler member or installation of the filler member in a liquid or semi-liquid form.

OBJECTS OF THE INVENTION

It is, therefore, one of the primary objects of the present invention to provide a solar heat collector for fluid heating having improved heat transfer characteristics.

Another object of the present invention is to provide a solar heat collector utilizing flow pipes or tubes for heat absorption and transfer.

Yet another object of the present invention is to provide a solar heat collector which has improved heating capacity.

A further object of the present invention is to provide a solar heat collector which has a reduced heat transfer surface.

An additional object of the present invention is to provide a solar heat collector which has an increased power output.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
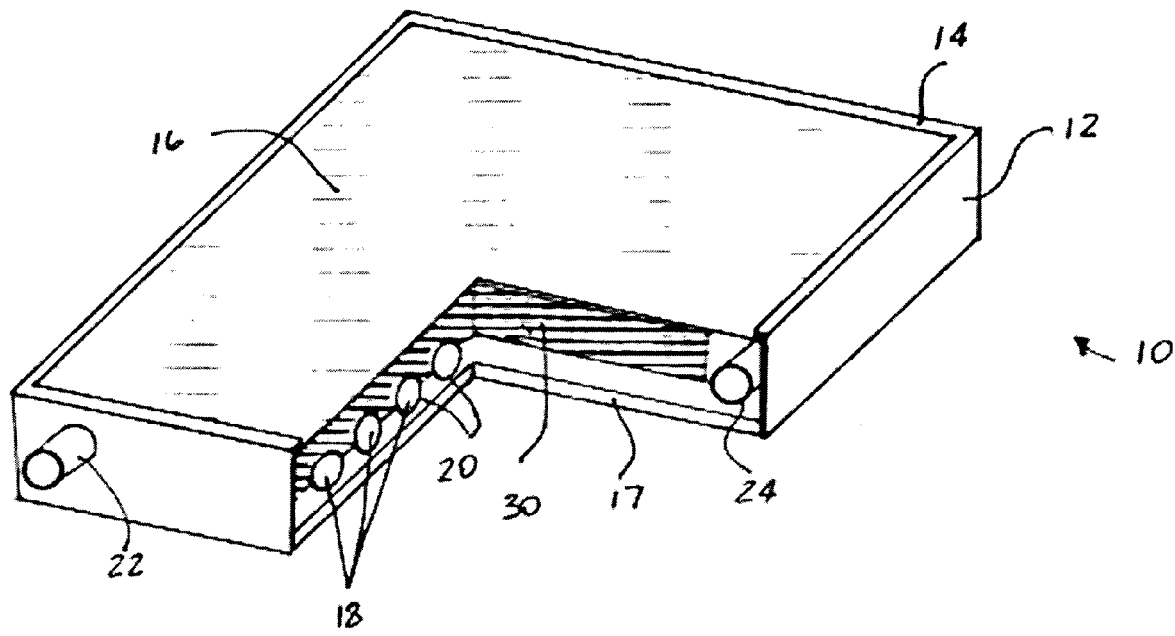
FIG. 1 is a perspective view with one corner removed which illustrates a presently preferred embodiment of the solar heat collector of the invention.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
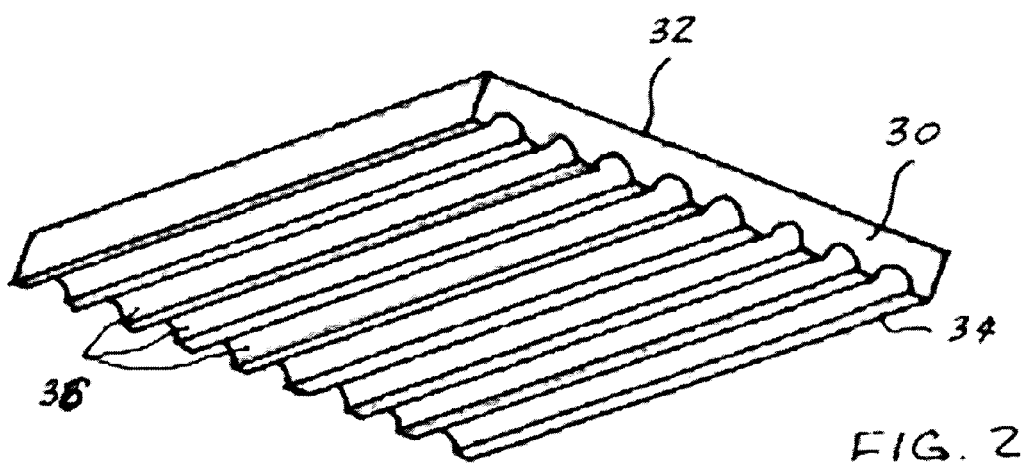
FIG. 2 is a perspective view of a filler member of the presently preferred embodiment of the solar heat collector in FIG. 1.

Reference is now made, to FIGS. 1-2, wherein there is shown a solar heat collector, generally designated 10, of the present invention which includes a housing 12 adapted for attachment to a surface of a structure (not shown). The housing 12 has a predetermined shape and size and has a first portion 14 oriented in a direction toward the sun. An absorption film 16 may be attached to the first portion 14 for improving absorption of the solar energy. A predetermined plurality of flow tubes 18, generally round in shape, are disposed within the housing 12 in a predetermined pattern and may be separated by an insulation means 17 from the attachment structure (not shown). Each of the flow tubes 18 has a first end connected to a fluid input 22 and has a second end connected to the fluid output 24. Preferably, each of the fluid input 22 and the fluid output 24 is a manifold.

A means 30 for improving heat transfer efficiency of the solar heat collector 10, best shown in FIG. 2, includes, in a preferred embodiment, at least a semi-rigid filler member 30, preferably of a unitary construction, having a predetermined thickness, which is disposed substantially intermediate an outer surface 20 of each of the tubes 18 and the portion 14 of the housing 12. Such unitary filler member 30 has a first surface 32 adapted for abutment with the first portion 14 of the housing 12 and an opposed second surface 34, preferably adapted with a predetermined plurality of cavities 34 substantially equal in shape to the outer surface 20 of each fluid tube 18 for receiving such fluid tubes 18. Such filler member 30 may be inserted into the housing 12 prior to closing the portion 14 with the absorption film 16. Advantageously, as best shown in FIG. 1, each of the cavities 36 engages approximately half of the outer surface 20 of each flow tube 18, although even if a lesser engagement of each of the cavities 36 engages approximately half of the outer surface 20 of each flow tube 18 they will be operative to improve heat transfer efficiency.

The material for such filler member 30 has a thermal conductivity greater than a thermal conductivity of air at zero degrees Celsius. Such material can be selected, for example, from any of the materials or any combination thereof given in the following table.

| Material | Thermal conductivity (W/m K) | Ratio By Air |
|---|---|---|
| Styrofoam | 0.01 | 0.42 |
| Air at 0 C. | 0.02 | 1.00 |
| Fiberglass | 0.04 | 1.67 |
| Cork board | 0.04 | 1.67 |
| Rock wool | 0.04 | 1.67 |
| Wood | 0.12 | 5.00 |
| Brick, insulating | 0.15 | 6.25 |
| Water at 20 C. | 0.59 | 24.41 |
| Brick, red | 0.60 | 25.00 |
| Glass, ordinary | 0.80 | 33.33 |
| Concrete | 0.80 | 33.33 |
| Ice | 1.60 | 66.67 |
| Mercury | 8.30 | 345.83 |
| Lead | 34.70 | 1,445.83 |
| Steel | 50.20 | 2,091.67 |
| Iron | 68.20 | 2,841.63 |
| Brass | 109.00 | 4,541.67 |
| Aluminum | 205.00 | 8,541.67 |
| Copper | 385.00 | 16,041.67 |
| Silver | 406.00 | 16,916.67 |

Table containing materials with thermal conductivity greater than air at zero degrees Celsius In operation, as the solar heat is first absorbed by the film 16, the filler member 30 of the present invention, having an improved thermal conductivity, further characterized by a reduced resistance to heat, improves heat transfer efficiency from the absorption film 16 to the outer surface 20 of each of the tubes 18, where such heat is absorbed by the fluid (not shown) flowing within each tube 18.

Such improved heat transfer efficiency of the filler member 30 when used in combination with the solar heat collector of the prior art enables it to increase caloric power output without increasing the quantity of flow tubes 18. It will be understood that a solar heat collector 10 utilizing the filler member 30 of the present invention may be manufactured with a reduced quantity of flow tubes 18 to provide substantially identical caloric power output to the solar heat collectors of the prior art.

Although the present invention has been shown in terms of the predetermined plurality of flow tubes 18 oriented generally parallel to each other and connected to parallel disposed input and output manifolds 22 and 24, respectively, it will be apparent to those skilled in the art, that the present invention may be applied to other configurations of the flow tubes 18. For example, a flow tube 18 formed in a serpentine configuration may be used with a filler member 30 having the second surface 34 adapted to receive such serpentine flow tube.

Furthermore, in applications prohibiting insertion of the unitary filler member 30, such filler member may be formed as a combination of a predetermined plurality of segments.

Additionally, a second filter member may be disposed toward the bottom of the housing.

Also, the filler member may be poured in liquid form or inserted in a semi-liquid form into the housing 12 encasing a predetermined outer surface portion of each fluid tube 18.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A solar heat collector for using solar energy to heat a fluid flowing therethrough, said solar heat collector comprising:
   (a) a housing having each of a predetermined shape, a predetermined size, a peripheral side wall, a first portion of said housing facing sun and an opposed second portion engageable to a structure;
   (b) fluid carrying means disposed within said housing for carrying said fluid between a fluid input and a fluid output; and
   (c) means encased within said housing, said means engaging said first portion of said housing and a predetermined portion of said fluid carrying means for improving heat transfer efficiency from said first portion of said housing to said predetermined portion of said fluid carrying means, said means formed from a predetermined rigid material having a thermal conductivity greater than a thermal conductivity of air at zero degrees Celsius.

2. The solar heat collector, according to claim 1, wherein said solar heat collector further includes a film means attached to said first portion of said housing for improved absorption of solar energy.

3. The solar heat collector, according to claim 1, wherein said solar heat collector further includes an insulation means disposed intermediate said predetermined plurality of said tubular members and said second portion of said housing.

4. The solar heat collector, according to claim 1, wherein said fluid carrying means is at least one tubular member having a predetermined shape and connected to said fluid input and said fluid output.

5. The solar heat collector, according to claim 1, wherein said fluid carrying means is a predetermined plurality of tubular members, each connected to said fluid input and said fluid output.

6. The solar heat collector, according to claim 1, wherein said means for improving heat transfer efficiency is at least a semi-rigid filler member having a predetermined thickness and having a first surface abutting said first portion of said housing and a second surface engaging said predetermined portion of said fluid carrying means.

7. The solar heat collector, according to claim 6, wherein said filler member has a unitary construction.

8. The solar heat collector, according to claim 6, wherein said filler member is formed as a combination of a predetermined plurality of segments.

9. The solar heat collector, according to claim 6, wherein said filler member may be one of poured in a liquid form or inserted in a semi-liquid form into said housing.

10. The solar heat collector, according to claim 1, wherein said solar heat collector further includes a second means engaging said second portion of said housing and a predetermined portion of said fluid carrying means for improving heat transfer efficiency from said second portion of said housing to said predetermined portion of said fluid carrying means, said means formed from said predetermined material having said thermal conductivity thereof greater than said thermal conductivity of said air at zero degrees Celsius.

11. A solar heat collector for using solar energy to heat a fluid flowing therethrough, said solar heat collector comprising:
- (d) a housing having each of a predetermined shape, a predetermined size, a peripheral side wall, a predetermined shape and a predetermined size, a first portion of said housing facing sun and an opposed second portion engageable to a structure;
- (e) fluid carrying means disposed and encased within said housing for carrying said fluid between a fluid input and a fluid output, whereby said fluid carrying means is heated by the solar energy absorbed by said first portion and transferred as heat therefrom to said fluid carrying means; and
- (f) means engaging said first portion of said housing and a predetermined portion of said fluid carrying means for improving heat transfer efficiency from said first portion of said housing to said predetermined portion of said fluid carrying means, said means formed from a predetermined material having a thermal conductivity greater than 0.06 W/m K.

12. In combination with a solar energy a solar heat collector for using said solar energy to heat a fluid flowing therethrough, said solar heat collector comprising:
- (a) a housing having each of a predetermined shape, a predetermined size, a peripheral side wall, a first portion of said housing facing sun and an opposed second portion engageable to a structure;
- (b) at least one tubular member having a predetermined shape and disposed within said housing between said first and second portion thereof, said at least one tubular member connected to each of a fluid input and a fluid output for carrying said fluid therebetween; and
- (c) a filler member encased within said housing and positioned intermediate said first portion of said housing and said at least one tubular member, said filler member having a top surface thereof abuttingly engaging said first portion of said housing and further having a plurality of cavities formed in an opposed second surface thereof and shaped to abuttingly engage an upper portion of an outer surface of said at least one tubular member so that said at least one tubular member is partially embedded therewithin, said filler member formed, prior to being positioned within said housing by a single piece or by a combination of a predetermined plurality of segments, from a predetermined material for improving heat transfer efficiency from said first portion of said housing to said outer surface of said at least one tubular member by substantially eliminating the presence of air therebetween.

13. The solar heat collector, according to claim 12, wherein said filler member receives said heat from said first portion of said housing in a radiant manner and transfers said heat to said at least one tubular member in a conductive manner.

\* \* \* \* \*